United States Patent
Dunne et al.

(10) Patent No.: US 10,359,997 B2
(45) Date of Patent: Jul. 23, 2019

(54) PROJECT MODELING USING ITERATIVE VARIABLE DEFECT FORECASTS

(71) Applicant: International Business Machines Corporation, Armonk, NY (US)

(72) Inventors: Jonathan Dunne, Dungarvan (IE); Paul H. McCann, Carlow Town (IE); Jeffrey B. Sloyer, Cary, NC (US); Ian D. Stewart, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/706,868

(22) Filed: Sep. 18, 2017

(65) Prior Publication Data

US 2018/0004488 A1 Jan. 4, 2018

Related U.S. Application Data

(63) Continuation of application No. 14/790,192, filed on Jul. 2, 2015, now Pat. No. 9,785,411, which is a continuation of application No. 13/897,398, filed on May 18, 2013, now Pat. No. 9,141,921, which is a continuation of application No. 13/897,337, filed on May 17, 2013, now Pat. No. 9,141,920.

(51) Int. Cl.
| | |
|---|---|
| G06F 9/44 | (2018.01) |
| G06F 8/20 | (2018.01) |
| G06Q 10/06 | (2012.01) |
| G06F 8/70 | (2018.01) |

(52) U.S. Cl.
CPC .......... *G06F 8/20* (2013.01); *G06F 8/70* (2013.01); *G06Q 10/06* (2013.01); *G06Q 10/06313* (2013.01); *G06Q 10/06375* (2013.01); *G06Q 10/063114* (2013.01); *G06Q 10/063116* (2013.01)

(58) Field of Classification Search
CPC ........ G06F 11/3466; G06F 11/3409; G06F 11/3419; G06F 11/3476; G06F 11/3664
USPC ............................................... 717/127
See application file for complete search history.

(56) References Cited

U.S. PATENT DOCUMENTS

| | | | |
|---|---|---|---|
| 5,869,977 A | 2/1999 | Kalb | |
| 7,398,510 B2 | 7/2008 | Lake | |
| 7,603,653 B2 | 10/2009 | Sundararajan et al. | |
| 7,617,303 B2 * | 11/2009 | Duggirala | G06Q 10/06315 379/111 |
| 7,856,616 B2 | 12/2010 | Chang et al. | |
| 2005/0005206 A1 | 1/2005 | Popescu | |
| 2007/0074151 A1 | 3/2007 | Rivera et al. | |
| 2010/0180259 A1 | 7/2010 | Lindley | |

(Continued)

OTHER PUBLICATIONS

Stephen H. Kan; Measuring and Managing In-Process Software Quality; IBM, Rochester, Minnesota USA.

(Continued)

*Primary Examiner* — Chuck O Kendall
(74) *Attorney, Agent, or Firm* — Grasso PLLC

(57) ABSTRACT

Project modeling is conducted using variable defect arrival rate or variable defect rate density parameters. These defect rates may be updated on an iteration by iteration basis and may be used to provide remediation and further project modeling, remediation, and prediction.

18 Claims, 7 Drawing Sheets

(56) References Cited

U.S. PATENT DOCUMENTS

2011/0067005 A1    3/2011    Bassin et al.

OTHER PUBLICATIONS

B.M. Subraya; System and Method for Defect Tracking in Software Projects, Feb. 3, 2011, ip.com.
Ghulam Mujtaba, et al; A Holistic Approach to Software Defect Analysis and Management; Australian Journal of Basic and Applied Sciences, 5(6): pp. 1632-1640, Apr. 2011.
Steven H. Kan, Software Quality Metrics Overview; Chapter 4, pp. 85-126, Addison-Wesley Professional, Dec. 2002.
Lakshminarayanan Devarajan, Alcatel-Lucent; Applying Software Defect Prediction Model for reliable product quality, ISSRE 2009.
William A. Florac,, Software Quality Measurement: A Framework for Counting Problems and Defects, Technical Report CMU/SEI-92-TR-22, ESC-TR-92-022; Software Engineering Institute; Carnegie-Mellon University, Sep. 1992.

\* cited by examiner

PROJECT MODELING USING ITERATIVE VARIABLE DEFECT FORECASTS

CROSS REFERENCE TO RELATED APPLICATIONS

This application is a continuation of U.S. application Ser. No. 14/790,192, which is entitled, Project Modeling Using Iterative Variable Defect Forecasts, and was filed on Jul. 2, 2015. The '192 application is a continuation of U.S. application Ser. No. 13/897,398, which is entitled Project Modeling Using Iterative Variable Defect Forecasts, and was filed on May 18, 2013. The '398 application is a continuation of U.S. application Ser. No. 13/897,337, which is entitled Project Modeling Using Iterative Variable Defect Forecasts, and was filed on May 17, 2013.

BACKGROUND

The present invention relates to project modeling, and more specifically to using variable defect arrival rates and variable defect density rates when forecasting, estimating or otherwise managing software project status, timetables, and deliverables.

Software project management regards tracking the progress of a software project for management and control. Monitored and managed aspects of a software project include man-hours expended to date, the quantity of programmers on a project, and the scheduling of the project in relation to the other software development projects.

Embodiments are directed to new devices, systems, articles of manufacture, and processes for monitoring, managing, and enhancing software projects.

BRIEF SUMMARY

Systems, apparatus, articles of manufacture, and processes are provided for forecasting, estimating, remediating or otherwise managing software project development. This management may include forecasting or estimating project related man-hours, reporting programming status, reporting projected target dates, and identifying remedial actions when forecasts deviate from earlier predictive project models or from revised targets.

Embodiments can employ measured and reported parameters for estimating, forecasting or otherwise managing a software project. Embodiments may provide estimates and forecasts in real-time, at targeted times, periodically, and in various other timing combinations as well. Estimates and forecasts may use various combinations of real-time and recorded parameters in various output models and in comparison to predictive project models and forecasted project models. An initial predictive project model may be rendered in embodiments and forecasted project models may be compared with the initial predictive project model. As the project work ensues revisions to the initial predictive project model may be made along with revisions to forecasted project models that may use real-time parameters, recorded parameters or both. Comparisons may be made between the models for management purposes. Also, remedies may be suggested and proposed when updated forecasted project models stray from an initial predictive project model or an earlier forecasted project model.

In use, embodiments may provide support to an interested person or group in order for him or her to estimate, infer or determine, in real-time, for historic project status, or both, whether a programming project is on schedule or otherwise satisfying targets. Interested persons or groups may also employ embodiments to estimate, infer or determine if a project has fallen behind schedule and by what quantity. Suggestions and remedial actions as to how to modify a project forecast to be off track may be provided. The remedial actions may seek actions to affect change in one or more of the parameters being tracked to generate the model. Upon identification, an administrator or manager may make system changes to improve performance reflected by a measured parameter or a reported parameter.

Parameters considered in embodiments may include a project's identified defects, and what remains to be tested, lines of code, and identified defects. Considering identified defects may include analyzing defect arrival rates, possibly in conjunction with other parameters, to assess overall project quality, project status, and sub-project status. Other assessments may be made as well.

In embodiments measured and reported parameters may be used as a basis for analysis, including an analysis to determine when defects in programming and the rate of arrival of these defects will reach zero or near zero. In embodiments, when variable defect arrival rates or variable defect density rates are predicted to reach zero or near zero, project forecasts may indicate that a project is near or at completion. In such cases the programming project may be considered complete or the software itself may be considered ready for release.

In embodiments, the use of predictive project modeling and forecasted project modeling for estimating and forecasting may be cumulatively referred to as defect trajectory modeling ("DTM"). This defect trajectory model can indicate existing and predicted defects in a project, including number of errors reported and number of faulty lines of code. In embodiments a DTM may be used to in real-time project forecasting and revised or updated project forecasting. Project forecasting may also be accomplished with the use defect repositories and test databases for storage and manipulation of measured and reported parameters. Through the use of these defect repositories and databases real-time data and historical data and analysis may be considered for predictive project modeling and forecasted project modeling. In embodiments, for example, if a project slips behind schedule, a DTM may be used to estimate how far behind a project is using variable defect arrival rates and variable defect density rates to propose current project status, to suggest remediation steps, and to forecast the effect of selected remediation steps in a revised model.

Embodiments may provide for real-time forecasted project modeling as parameters including defect arrival rate and defect rate density are received and updated. Sub-components of a project may be monitored and forecasted as well. These updates may be used for further forecasting from the current project position, for example, what time the project is presently forecasted for and how changes in various remedial actions affect the forecast. Thus, in embodiments, a displayed forecasted project model employing variable defect rates may be adjusted in order to consider changes in strategy and determine the effective or desirable management strategies.

Thus, in embodiments the defect rate can vary and can employ a variable defect density rate ("VDDR") or variable defect arrival rate ("VDAR") or both. These VDDR and VDAR may be used when creating the forecasted project model and the DTM. The variable defect density rate or arrival rate, when analyzed, may reflect projected future program status and expected defects when considered with objective and subjective parameters of the project. The objective and subjective parameters may be measured on a periodic or cyclical basis to determine a VDDR or VDAR or both for an analysis. As the measurables making up the parameters change, so too would the VDDR and VDAR, and so too would the DTM being forecasted for the project using the VDRD or VDAR. These variable defect rates may be updated on an iterative basis such that a single VDDR or VDAR may not apply for an entire software project or even for a sub-project but may, instead, apply solely for a modeling iteration. The variable defect rates may be used to estimate and forecast the project based on both targeted desired parameters and measured parameters.

In embodiments, updates and new requirements may be added to build a revised DTM on an iteration by iteration basis. Thus, in embodiments, DTMs may be built and revised and rebuilt as a project generates additional code or there are indications that new code remains to be written, as each may result in additional defect volatility and result in a modified DTM that accounts for this additional new code or other changes affecting expected volatility.

A forecaster may be used in embodiments along with a development manager to receive and consider point in time analytics from defect repositories, tracking registries, and test management systems, when modeling project forecasts and creating real-time or revised project forecasts.

In embodiments, project forecasts may also be calculated using parameters of an arrival rate backlog plus the amount and type of testing left to complete. These forecasts may be used to infer how many additional defects are likely to be added to an open queue.

Embodiments may provide a software management system to visually model the DTM, including the trajectory of a software release cycle, track the release cycle in real-time, and enable a software management team to infer if the project is on schedule. Embodiments may also predict by how far off a project is from its current schedule using a current defect backlog, i.e. a determination of the number of existing defects, and what remains to be tested in the project. Embodiments may even forecast, for use by a development/release management team or other, a system to model a preferred defect trajectory, including by which date the project or sub-project can or will reach virtual zero defects.

In embodiments, the number of existing defects may be forecast by multiplying the number of existing lines of new code by a VDAR or VDDR. As described below, this VDAR or VDDD may vary for each iterative calculation and may consider or account for various parameters before being determined or adjusted for the particular iteration. Other and additional embodiments are also possible and should not be considered limited to the foregoing or what is explicitly described below.

DETAILED DESCRIPTION

Figure 1:
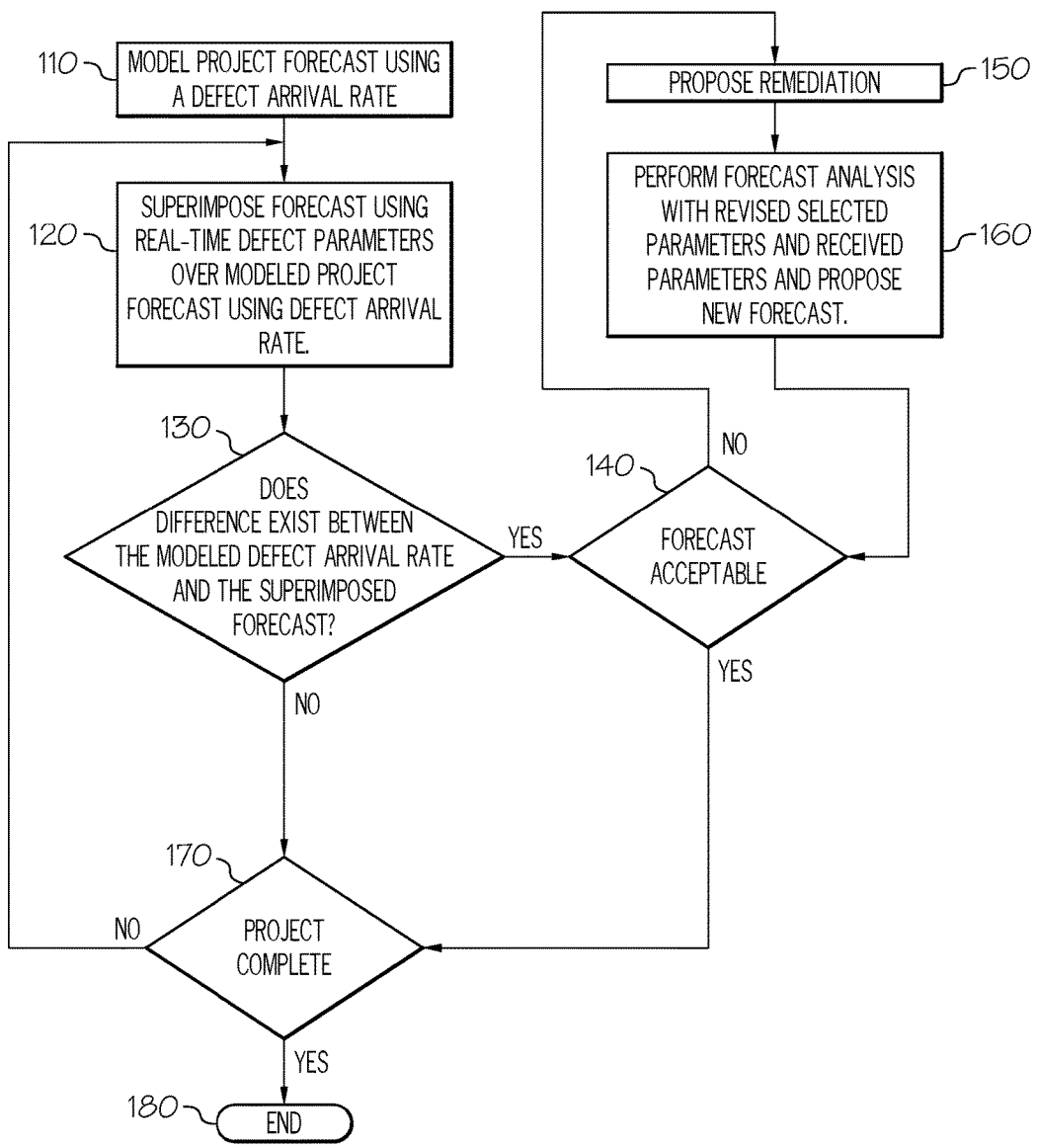
FIG. 1 shows project modeling using variable defect rates as may be employed in embodiments.

Systems, processes, apparatus, and articles of manufacture are provided for estimating and forecasting software programming and development. Embodiments may be employed to model and manage the progress of a software project. This may include tracking software release dates and underlying project milestones ahead of any release dates. Embodiments may track, forecast or otherwise assist with managing software projects by monitoring defect counts, rate of change of defect counts, and defect count density and use this information to model when a software module of the software project or the entire software project is expected to reach virtually zero defects.

Embodiments may model or otherwise forecast defect trajectory on a week-by-week basis and may also illustrate the defect incoming and outgoing rates and densities in real-time using a defect trajectory model ("DTM"). Thus, using forecasts, estimates and existing project position, when a project will reach virtually zero defects may be forecast and reported. In so doing, when a project goes off track, embodiments may be employed to estimate by how much (in terms of person days/weeks, resources, funding, etc.) the project is off schedule and to make remedial suggestions, to promote meeting or exceeding target mileposts. The defect trajectory may reflect a current backlog of defects identified in existing code as well as forecasts of future defect numbers and rates of change of defects. Thus, the slope of an expected or predicted defect trajectory may be considered to model the parameters of a project and when it is anticipated to reach project milestones, interim targets and completion targets.

In embodiments a defect trajectory model ("DTM") may be established using a variable defect density rate ("VDDR") or a variable defect arrival rate ("VDAR") or both and a number of recorded and real-time parameters associated with the project or earlier known projects. These parameters may be sent ahead of time, such as project targets and goals, and may also represent measurements of the progress of the project, such as thousands of lines of code, the number of programmers working on the project, and the amount of test cases run or expected to be run on components of the project. These parameters may also reflect known parameters and outcomes from earlier projects for purposes of comparison with an existing project and modeling of an existing project. Once parameters have been established and data received for the measured parameters, a defect trajectory model may be generated. In embodiments, this defect trajectory model may be created in real-time to track and manage software project development. The real-time estimating and forecasting may be provided across a network to interested users or subscribers and may used to update tracking databases or other storage depositories that may store parameters for modeling the project and other projects.

A defect trajectory model may have numerous uses. For example, if a project slips behind schedule, DTM embodiments may provide for forecasting the project trajectory to its end date based on its current position, with the purpose of showing how far behind in person days/weeks or other measured parameter a project is and to suggest remedial steps as required. A DTM may be modeled by using an analysis of real-time defects, rate of change of defects, arrival rate of defects, testing of tracking repositories, and analysis of tracking repositories. Thus, embodiments can provide input of project variables that will display a dynamic defect trajectory model for forecasting and estimating.

In embodiments, the DTM may be modeled using a variable defect rate. A VDDR or VDAR being applied in DTM modeling may change over time, with updates from the project, such that as new requirements/code are added the VDDR or VDAR may be revised on an iteration-by-iteration basis. This iterative updating of the VDDR or VDAR captures additional defect volatility within new or revised code that may arise when generating additional code. For example, immature code or functionality may have a greater fault density per thousand lines of code ("KLOC") than more mature features/components embodied in code. Accordingly, embodiments may account for this volatility by employing a non-constant fault density model as part of an agile project management process.

FIG. 1 shows logic as may be employed in embodiments. The logic employed may include, as shown at 110, forecasting a project model of a project using a defect arrival rate or a defect density rate. Once modeled, a revised forecast may be superimposed over a predictive project model to reflect real-time parameters of a project, which is shown at 120. At 130 a comparison may be carried out between the predictive project model and the forecasted project model using the real-time parameters to determine if a difference exists. If none exists, a determination will be made at 170 as to whether the project is complete. If the project is complete the modeling ends. If not complete the comparison cycle continues and reverts back to 120. While at 130, if a difference does exist a determination may be made at 140 as to whether the difference is outside of an acceptable margin of error, e.g. 1%-3% of the original predictive project model. If the difference is within the margin of error a determination may be made, as shown at 170, as to whether the project is complete. If the difference observed is outside of the margin of error at 140, remediation may be proposed at 150. At 160 a revised forecasted project model using the accepted remediation is conducted and if the updated forecasted project model is acceptable a project complete test may be performed as shown at 170. If the revised forecasted project model using the accepted remediation is unacceptable additional remediation may be proposed, as shown at 150. This forecasting and adjustment loop may continue until acceptable forecasted project models are provided.

Accordingly, in embodiments, progress may be tracked towards an established goal, e.g. zero defects by a given date, and embodiments may perform predictive analysis. Thus, if a project appears to be off track, the length of the variation may be determined and scenario's can be proposed and analyzed with outcomes to determine how deploying resources affects the new forecast model and by how much will the forecast model be influenced.

Embodiments may also provide a framework that integrates and gives structure to the discovery, reporting, and measurement of software problems and defects found by the primary problem and defect finding activities. Measurable attributes common to these identified activities may be identified and organized to reduce misunderstandings of measurement results and can be applied to address the information needs of different users.

Embodiments may further use point in time data from defect repositories and use this point in time data to generate a variable defect arrival rate model or a variable defect density rate and then superimpose revised models using these variable rates over real-time defect metrics. In so doing an analysis of the difference between predictive project models and forecasted project models may be completed to determine if the project is off track.

The parameters employed in embodiments may be both objective and subjective and real-time and recorded and may include: number of lines of project code written; number of lines of project code expected; number of lines of new project code written; number of lines of new project code expected; number of lines of changed project code; lines of code completed; errors found in lines of code; manpower committed; programming language employed; age of programming code; and lines of code forecasted; number of development resources; number of employed development resources; number of available development resources; the running status of test cases; the results of running test cases; the type of code being programmed, the age of existing code; the complexity of the code; the experience or programmers; and the number of programmers.

In embodiments, when considering the period of iteration when creating the models, an applicable time frame can be calculated by the current arrival rate backlog plus the amount and type of testing left to complete. Also, as immature code or immature functionality have been found to have a greater fault density per thousand lines of code ("KLOC") than more mature features or components, the VDDR or VDAR and resulting DTM may each reflect this and take account of this volatility. Put more generally, embodiments may score an arrival rate or defect rate using a non-constant fault density model as part of an agile process for providing DTMs of a software project.

Also, in preferred embodiments, an arrival rate model or defect rate density need not use a known or established defect rate/density as new requirements/code are added on an iteration by iteration basis. As new code is generated there may be additional defect volatility within the code, e.g. immature code or functionality may have a greater fault density per KLOC than more mature features/components, thus, the model in embodiments can be adapted to take account of this volatility.

KLOC being measured in embodiments may include thousands of lines of new code as well as thousands of lines of code that have been changed. The new code may be designated $KLOC_n$ while the changed code may be designated as $KLOC_c$. Also, in embodiments, where a project is behind, a GUI element employing analytics in a DTM can recommend specifically where remedial action may be taken to get the project back on its original schedule.

The KLOC parameter, which represents thousands line of code, which are either new or have been changed can be used as a parameter in embodiments. This parameter may be identified and measured to determine in a given component how many defects are anticipated to be found in that component. A determination may be made when given the number of lines of code in a given component how many defects may be found in that component. This determination may consider both $KLOC_n$ and $KLOC_c$. Also, KLOC, along with other parameters, may be used in a predictive algorithm to take point and time analytics from defect repositories and test management systems to determine existing status of the project testing and a comparison to the predictive project model.

Figure 2:
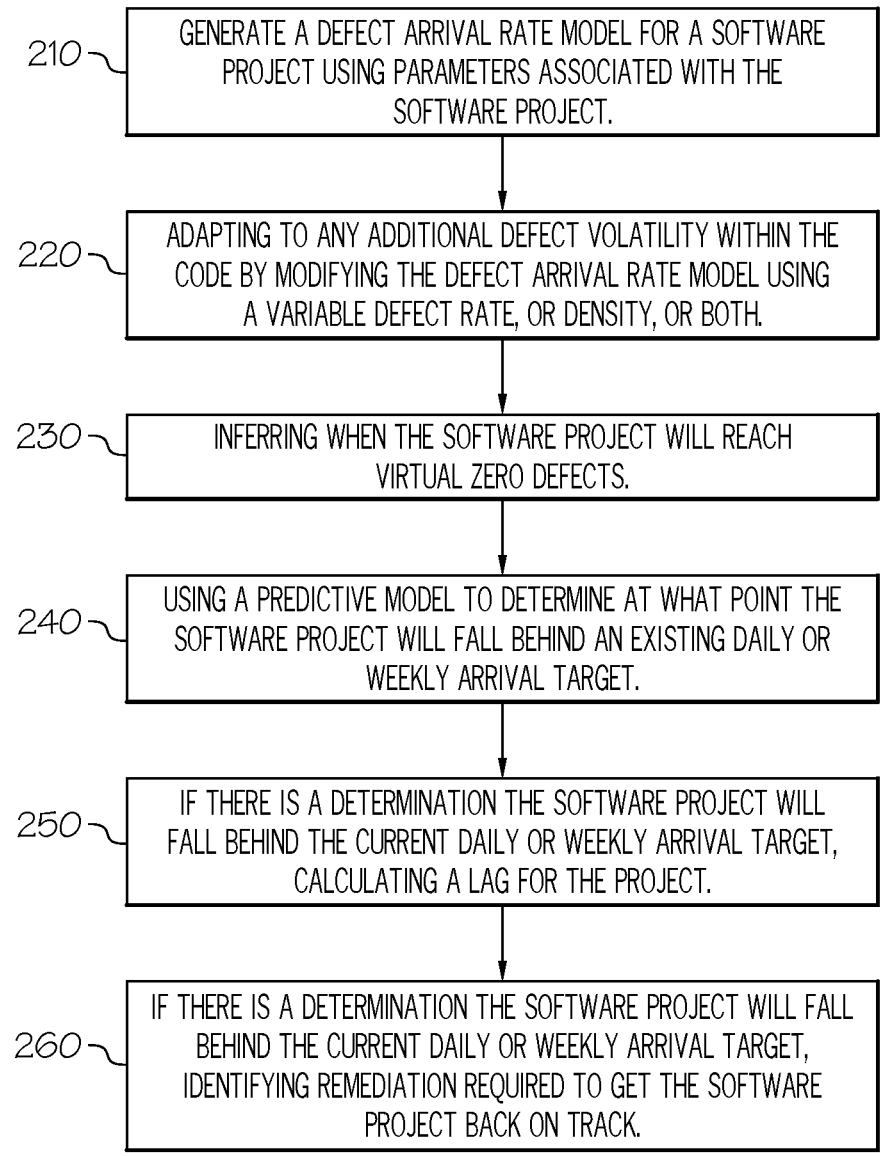
FIG. 2 shows software project modeling using variable defect rates as may be employed in embodiments.

FIG. 2 shows logic as may be employed in embodiments. This logic may be carried out in whole or in part in various devices and systems and may be stored on articles of manufacture used in those systems and devices, or in communication with those systems and devices. It may likewise be employed in various processes employing one or more devices or systems. Shown in FIG. 2 at 210 is that a defect arrival rate (or defect density rate) may be generated for a software project using parameters associated with the software project. These parameters may include: (1) lines of code; (2) development resources; (3) project duration; (4) a fault density function for each test iteration/phase; (5) functional test defects; (6) system test defects; (7) maturity assessment of one or more components; and (8) complexity assessment of one or more components. Next, as shown at 220, embodiments may modify this defect arrival rate (or defect density rate) and an associated model to adapt to the anticipated defect volatility.

Whether or not the adaption is made in embodiments, an inference may be made as to when virtual zero defects for the project may be reached. This inference is shown at 230 and reaching this inference may include using: (1) a defect arrival rate model; (2) point and time analytics from defect repositories; and (3) test management systems that identify a project testing current status relative to the arrival rate model.

As also shown at 240 of FIG. 2, a predictive model, whether the same or additional, may also be used in embodiments to determine if or when a software project will fall behind a target, such as a daily or a weekly target. The predictive model may employ this same or different methodology to make an initial predictive model of the software project or a revised model of the software project for purposes of comparison. The forecasted model and the predictive model for daily, weekly or other mileposts may be calculated using a current arrival rate backlog plus a quantified amount and type of testing left to complete in order to forecast how many addition defects are likely to be added to an open queue.

A comparison between a predictive model and real-time forecasts reflected in a forecasted project model may reveal a lag for the project. This lag may represent that the software project will fall behind the current daily target or the current weekly target or some other periodic or known target. A lag consideration is shown at 250 of FIG. 2. Should a lag or other variation be forecasted, see, e.g., Figure at 260, remediation may be proposed for returning the software project back to an earlier forecast, a revised forecast, or a preferred forecast. In embodiments, a graphical user interface element may provide software analytics and visual comparisons for the analytics. It may also provide reporting of the recommendations for remediation of the project and return to a suitable predictive model.

As noted, the VDAR and the VDDR may be updated on an iteration by iteration basis. In embodiments, the time frame ($TF_i$) for such an iteration may be calculated by considering the current arrival rate (CAR) plus the type of testing remaining (TTR) and the amount of testing remaining (ATR). This may be shown in a form as such:

$$TF_i = CAR + TTR + ATR$$

This time frame may be considered to be part of a forecasting function, which updates the VDAR or the VDDR in order to indicate how far ahead or behind a project is in terms of a period of time, including days and weeks.

Thus, in preferred embodiments the defect arrival rate predicted for a set number of lines of code is not constant. The defect rate per lines of code or density of defects may be initially set at various ratios depending upon the type of code, its functionality, and its prior history. For example, immature code may have a greater fault density per KLOC than more mature code. Likewise, functional code may have a greater fault density per KLOC than definitional code. Fault density and defect arrival rate may also consider the software language being employed and set defect trajectory models based on the type of code, its functionality, and the history of the code. These initial settings may then vary as the project continues and parameters are measured and considered. Thus, a variable defect or fault arrival rate is variable in that the predictive amount of errors of code for a certain period of time will vary over the lifecycle of a project. Likewise, a variable defect or fault density rate is variable in that the predictive amount of errors in a certain volume of code will vary over the lifecycle of a project.

Similarly, the generation class of the language may also affect a defect density or arrival rate assigned because first and second generation languages (machine languages and assembly languages) may be afforded very high defect densities and arrival rate while third and fourth generation languages (human readable programming languages) may be afforded lower defect densities and arrival rates and fifth generation languages (neural networks) may be afforded still lower defect densities and arrival rates.

In preferred embodiment, forecasted defect rate density and forecasted defect arrival rates may be updated and revised in an iterative process based on objective and subjective factors. The objective factors can be time since last revision, the generation of the language, number of revised lines of code versus entire section length, the total number of lines revised, the component on which the code is executing, the component on which the code was created or edits, and the known compatibility between the code and the component on which the code is executing. The subjective factors can include the history of the programmer making the edits to the code. A logical representation employing the defect arrival rates may be as follows:

$$DAR_n = DAR_n-1 + \Delta OF_n-1 + \Delta SF_n 1$$

The preceding equation shows how a defect arrival rate (DAR) for use in a calculation can be revised to account for the previous defect arrival rate (DARn−1) plus adjustments for objective factors for the previous iteration (OFn−1) plus the adjustments for subjective factors for the previous iteration (SFn−1). In so doing, when a defect arrival rate is used in a calculation it may vary from the last DAR used in the immediately previous calculation and forecast. Thus, as objective and subjective factors change the DAR may be adjusted for use in conducting forecasts and estimates. This adjustment may be made for set periods of time, when updated forecasts are requested and in real time as well. In embodiments, a defect rate density may be substituted for the defect arrival rate employed in the preceding equation. Defect density rate may be determined in the same way, but adjusted for density rather than arrival rate per time period, in embodiments.

By way of example, a programming project may involve third generation languages and fourth generation languages, may have an estimated three hundred thousand lines of finished code, an estimated one hundred thousand lines of already written code, four programmers of varying skill levels and one with previous experience writing the existing code. From all of this an update period of four hours may be set for modeling. For each update period one or more queries may be sent to gather current information for making the DTM and updating any predictive project model as requested by a user. Making these updates may include querying several tracking registries that are updated in real time with status of the various objective and subjective factors being considered for constructing a VDAR or a VDDR. These registries or other sources of objective and subjective parameters may themselves periodically send their status to a development manager for later analysis and with or without receiving a query. This development manager may act to determine a current defect arrival rate and calculate one or more forecasts using the VDAR and one or more defect trajectory models.

Figure 3:
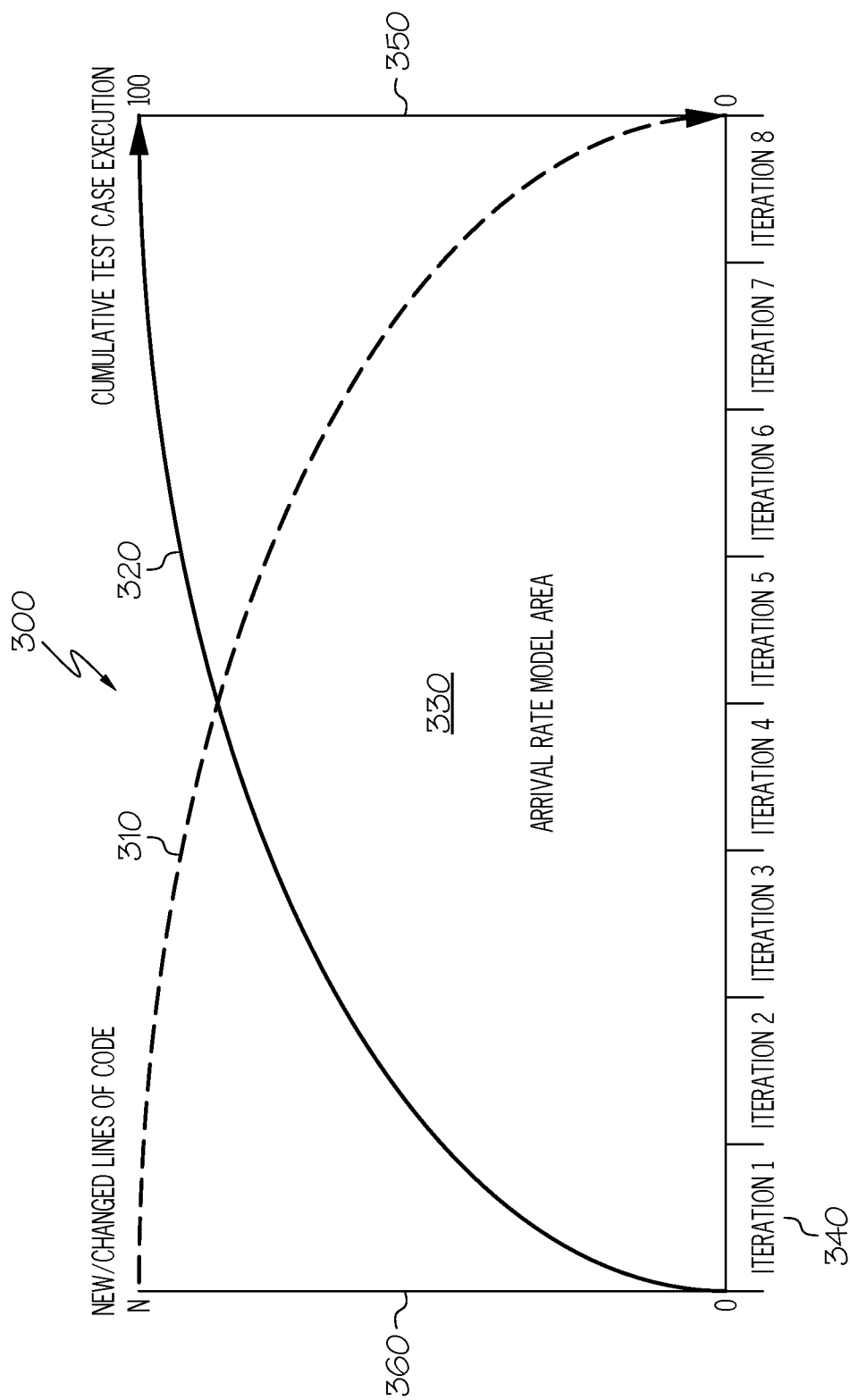
FIG. 3 shows a graphical analysis of modeling as may be employed in embodiments.

FIG. 3 shows an arrival rate model 300 in accord with embodiments. As can be seen new and changed lines of code 310 is a parameter that may be measured and forecasted over a series of iterations 340. Likewise, a cumulative test case 320 may be built and projected over these same or similar iterations 340. When presenting models and forecast the y-axis as shown in FIG. 3 at 360 may reflect measured number of defects per thousand lines of code and another y-axis as shown here at 350 may reflect percentage accuracy or project completion. In embodiments, the y-axis 350 may start at or near zero and may move to 100 percent while the y-axis 360 may start at a measured number of errors at a first iteration and move to zero defects or near zero defects. The area under the intersection of the $KLOC_n$ (new) and $KLOC_c$ (changed) measurement line 310 and the predictive cumulative test case line 320 may be considered to be the area of arrival rate model 330.

As noted, in embodiments, the forecast of the number of expected defects for a certain iteration may be based on the $KLOC_n$ and the $KLOC_c$. For a certain iteration the forecast may include identifying which components will be tested for the iteration. This can include assigning a higher testing priority to the newest modules and to the modules with the largest amount of code change as compared to older modules and those with less lines of code. For this same iteration, or for other iterations, the forecasting may also include the original project duration or any updates provided for this parameter as well as how many iterations are expected for the project, how many iterations have occurred, and how many iterations remain.

For some or all iterations, the number of expected test cases to be run for the existing code will be input and considered as a parameter where, for example, each ten test points an hour or other period of time will be estimated. In other words, the time for intermediate testing of the existing code can be considered during projects where a standard estimate or range of estimates may be included in projects for the amount and type of testing to be conducted. Also, the number of lines of changed code for an iteration may be identified and considered for setting a VDAR or a VDDR. These variable rates may be assigned for the current iteration and may be assigned to the next iteration as well.

In embodiments, variable rates and variable densities may also be modified for use in the next iteration after considering tracked or other parameters. The parameters that may be used to adjust a VDAR or VDDR may include the existing percentage of defects, the complexity of the code, the maturity of code, the type of code, the age of code, the maturity of an unfinished component, the number of unfinished components, the number of finished components, the number of programmers assigned to the project, the number of available programmers for the project, project duration, functional test defects, system test defects, the amount of remediation identified in the last iteration and the amount of remediation adopted for the current iteration.

In embodiments it is predictable that the VDAR or VDDR will be higher for iterations that are early in the project than those that come later on. Accordingly, for generating a DTM for a given project, the parameters may be forecasted out several iterations until completion is reached and then as the project is completed the DTM may be adjusted using revised parameters as well as the VDAR or VDDR, which can vary for each iteration.

In embodiments, the variable defect density preferably does not have a constant defect density. In other words anticipated defects may not be solely linked to lines of code multiplied by the measured defect density or the anticipated homogenous defect density. Accordingly, the density of predicted defects for each component will likely be different and may depend on component complexity. Thus, like arrival rate, defect density may vary and can be different for different lines of code, having a higher density in some portions of the project coding and lower portions in other portions of the project. For example, when completely new coding is performed the defect density may be higher than when old code is reused and reshaped with additional variable or calls to accommodate a new function or input. In embodiments, the density for each component is expected to be different, depending on component complexity, and this difference is not perceived to be accurately modeled as part of a constant density function.

In embodiments the DTM can be illustrated by means of a graphic user interface dashboard that presents, in real-time, the status of a project and how the project arrival rate model is located with respect to the established model. In other words, an established predictive project model may be displayed for a user in conjunction with a real-time forecasted project model for comparison and analysis. The real-time forecasted project model may use the parameters described herein for creating the forecast and any estimates provided. These parameters may include: lines of code, development resources, project duration, fault density and fault rate. The fault density for each test iteration/phase may include functional test defects, system test defects, maturity of a given component, and complexity assessment of a given component. Forecasted time may be set by using the current arrival rate backlog plus the amount and type of testing left to complete. From these parameters a forecast as to how many addition defects are likely to be added to the open queue may be made.

Figure 4A:
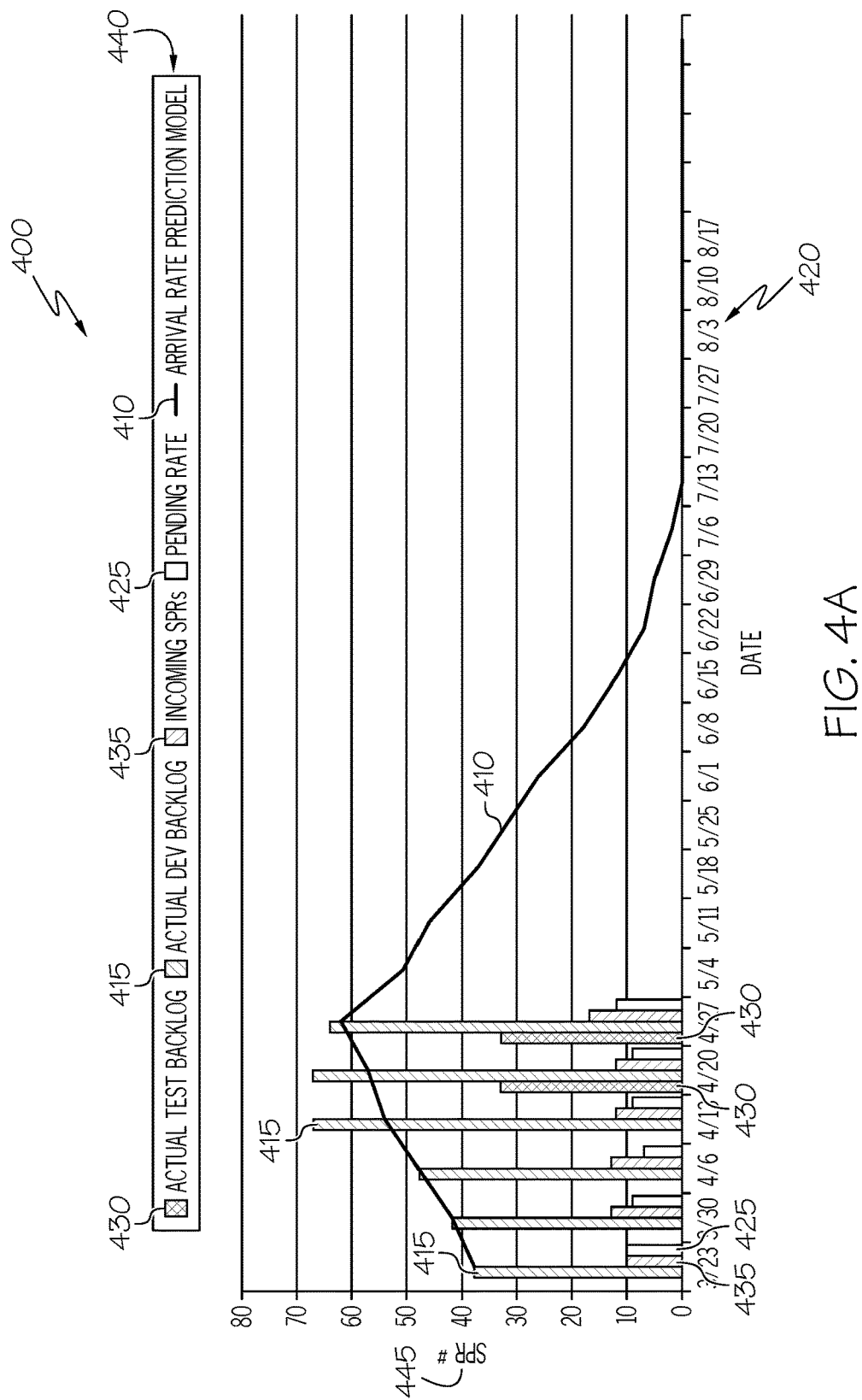
FIG. 4A shows graphical reporting and analysis employing variable defect rates as may be employed in embodiments.

FIG. 4A shows a visual model that may be built and used to manage a software project in accord with embodiments. The model 400 reflects a forecast using VDAR in accord with embodiments and the model 450 supplements the forecast in model 400 with an alternative forecast model for purposes of comparison. The forecasted project model is shown at line 410 in models 400 and 450. The bar graphs reflect parameters of actual measured testing backlog 430, actual measured deviation backlog 415, Sampled Predictive Rates (SPRs), and forecasted or applicable VDAR 425. Each of these parameters may also be used to arrive at the predictive model 410.

As can be seen in the model 400, the first three weeks of the project, i.e., 3/23-4/6, the measured deviation of backlog of work was consistent with the project model but then during the weeks of 4/13-4/27 the backlog of work exceeded the forecast shown in line 410. This deviation may alert a manager or administrator that adjustments may need to be made to the project in order to place the project back within the expected tracking of the predictive forecast model line 410. Noticeable in model 400 is that the pending defect arrival rate or VDAR 425 varies for each week of the models 400 and 450. Also noticeable is that the incoming SPRs also vary for each week in both models 400 and 450.

Figure 4B:
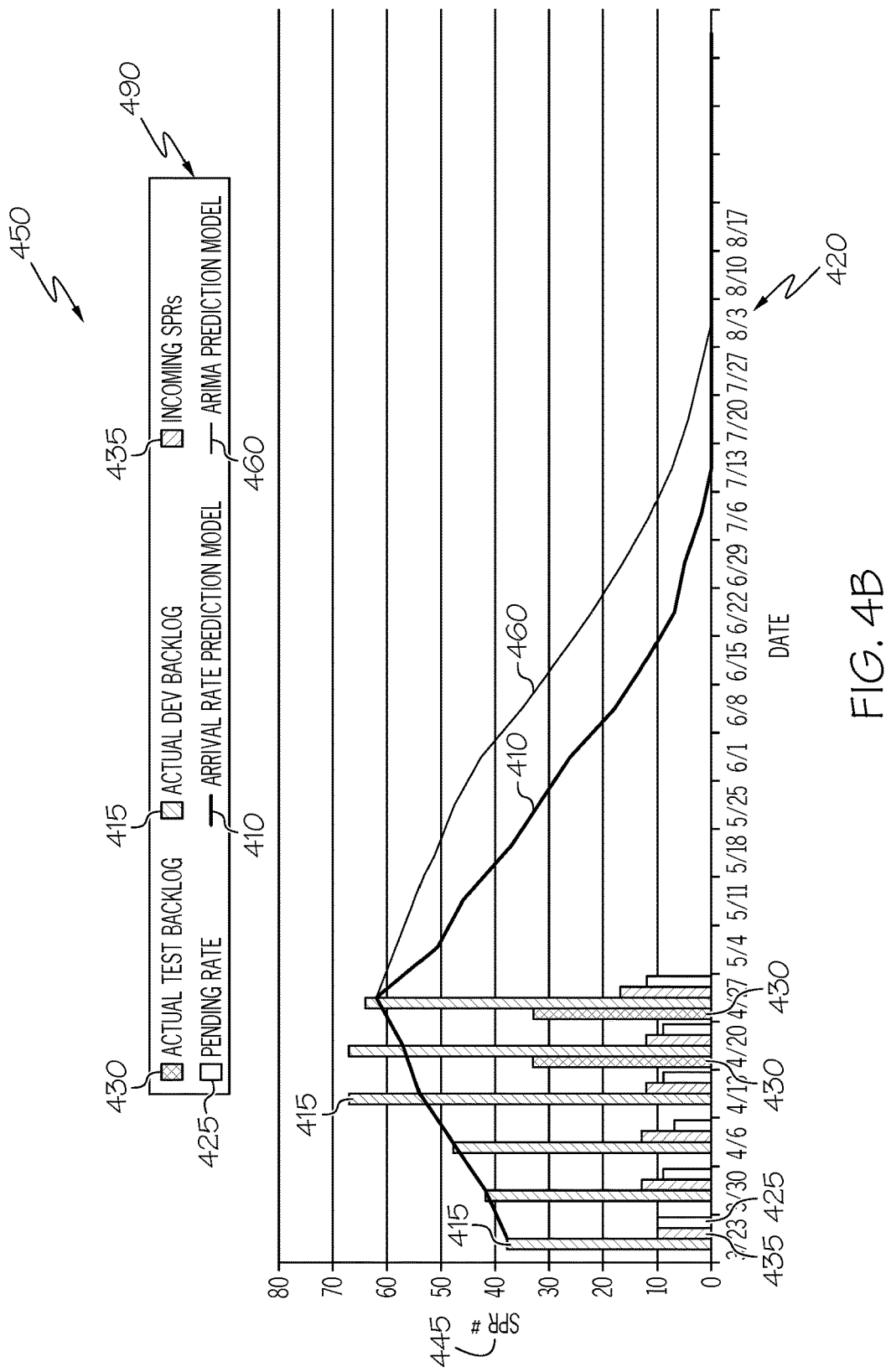
FIG. 4B shows graphical reporting and analysis employing variable defect rates as may be employed in embodiments.

Model 450 of FIG. 4B shows how other modeling processes may also be used in conjunction with embodiments. For example, an ARIMA prediction forecast 460 may be employed and juxtaposed with the arrival rate predictive model line 410 as shown in model 450. These additional models, which may be used for forecasting many weeks or months into the future, may be used to set new goals or target date parameters that may then be inputs to the models of embodiments. In other words, as shown in model 450, the ARIMA prediction model 460 forecasts a completion date three weeks after the forecasted project model line 410, which is using the previously set parameters.

Using this ARIMA predictive model a development manager, whether a person or a component programmed to carry out embodiments, may update forecasting parameters or settings used in generating the ARPM model line 410 to account for this new information. These forecasting parameter changes may include adjusting the project completion date, modifying the existing VDAR for the next iteration, completing remedial actions such as adding more programmers or changing the overall experience level of the programmers working or changing the deliverables for the project.

In embodiments, upon identifying that project forecasts are being met a development manager may take no additional steps or upon seeing that backlog targets or other parameters are not being met, a project manager, whether a person or a component configured consistent with embodiments, may identify remedial action for bringing the project back on schedule. In addition to providing remedial actions, embodiments may also include assessing the defect arrival rates to assess overall project quality.

Thus, in embodiments, a defect arrival rate model may be used by a defect trajectory model (DTM) to forecast when a software project will reach virtual zero defects. Also, as shown in FIG. 4, a DTM may also include additional predictive modeling to determine when a project falls behind it's currently daily/weekly arrival targets, how far behind the project is, and what remediation will be required to get the project back on track. As with providing the amount of time a project is behind, embodiments may also forecast how far ahead a project is in terms of days, weeks or other period.

As to forecasting a project, in embodiments a Development Manager may set a project schedule after identifying the parameters of the project. These parameters may include both principle goals of the project and ancillary measurable of the project. The parameters may be used to build the DTM model. As measured parameters arrive for this model the VDRD may be adjusted/recalculated and the most current measured parameters may be input for consideration when generating an updated DTM model. This arrival and recalculation may be hourly, weekly, and at other time periods as well, including real-time.

In embodiments, in addition to parameters provided by a project manager embodiments may also receive parameters measures from defect repositories and test management systems. These repositories and systems may store data from similar projects, similar components, similar lines of code, similar code maturities etc. In other words, the defect repositories may store, for future retrieval, chronologies of past projects for use in predictive modeling.

In embodiments, current and project relevant information or parameters may be used rather than historical data of an organization. Likewise the use of in-process defects, i.e., the total defects created and removed, may be avoided to predict the residual defects found by a customer. Thus, in embodiments, assessing the defect arrival rate may be used to assess overall project quality and as described above, analysis of the lines of code of a product may be used as a basis for analysis which will determine when the arrival rate of errors is predicted to reach zero.

Still further, in embodiments the software may be broken down by module. In so doing, embodiments can determine whether more defects occur in mature modules or areas of code or in new modules or areas of code. This specialized parameter may be shared with other projects and across programming groups, programmers, and other related projects having analogous parameters or inputs. In embodiments, an Agile predictive model may also be used that models the variability from iteration to iteration.

Figure 5:
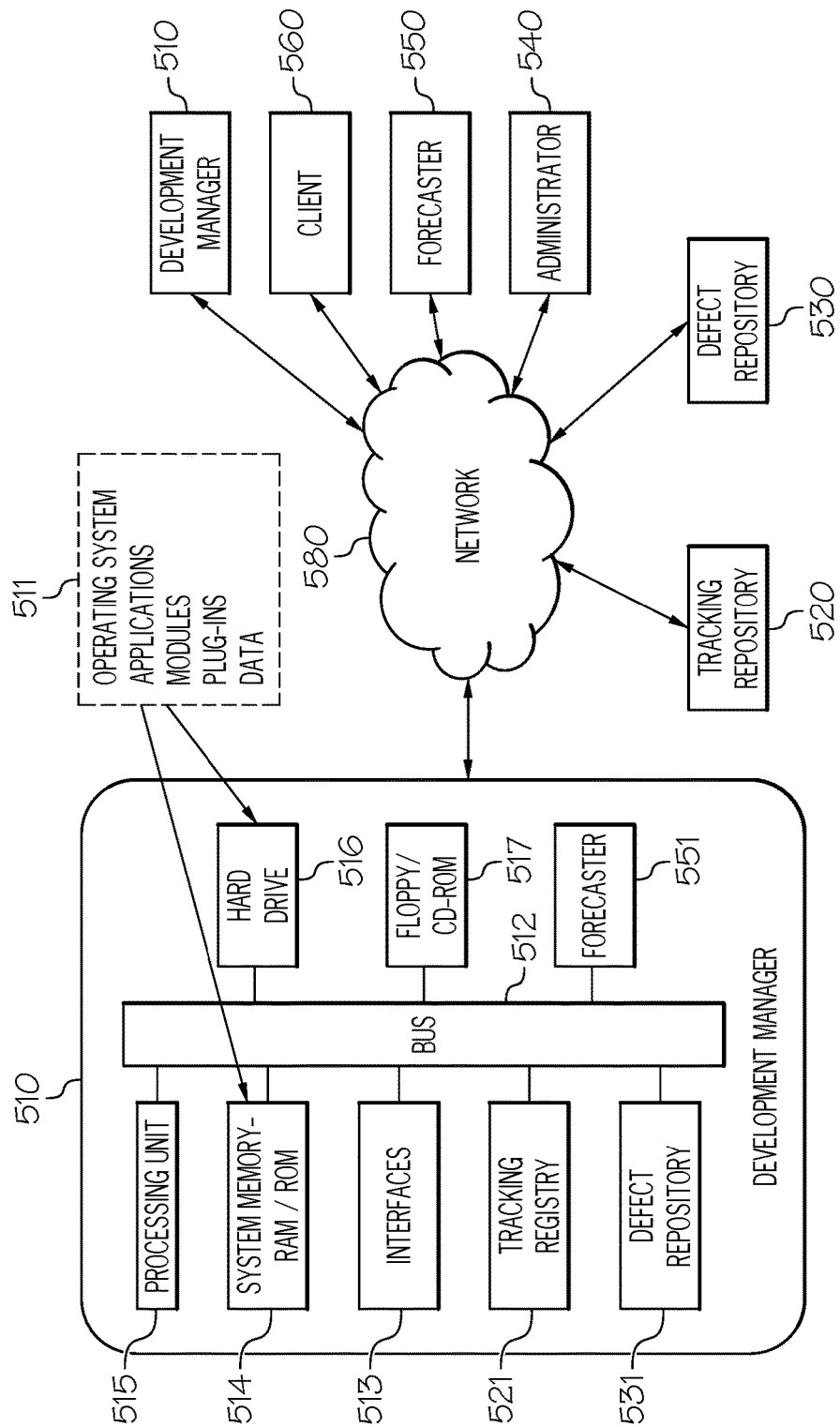
FIG. 5 shows a development manager and system as may be employed in embodiments.

FIG. 5 shows a system as may be employed in embodiments. Visible in FIG. 5 are development mangers 510, client 560, forecaster 550, administrator 540, defect repository 530, tracking registry 520 and network 580. The development manager 510 may include code 511 loaded on the hard drive 516 and memory 514 to be run on the processing unit 515. This code 511 may include an operating system, various applications, modules, plug-ins and data. Also present in the development manager may be tracking registry 521, a defect repository 531, a forecaster 551, interfaces 513, portable storage 517 and a bus connecting each of the internal components.

The development manager 510 may communicate with or serve to control, over a network, one or more of the components shown in FIG. 5. This communication and control may occur over the network 580 and may serve to determine an applicable VDRD or VDDR as well to manage inputs and queries for the forecasting and modeling. As can be seen, in embodiments a forecaster 551 may be resident within the development manager as well as a service or component available over a network. Also, multiple development managers may be used in forecasting systems. In these instances, the development managers may share duties and may provide discrete services as well.

In embodiment the development manger 510 may be suitable for storing and/or executing program code including at least one processor 515 coupled directly or indirectly to memory elements through a bus system. The memory elements in embodiments can include local memory employed during actual execution of the program code, bulk storage, and cache memories which provide temporary storage of at least some program code in order to reduce the number of times code must be retrieved from bulk storage during execution.

The memory elements may include system memory 514 in the form of read only memory (ROM) and random access memory (RAM). A basic input/output system (BIOS) may be stored in ROM. System software 511 may be stored in RAM including operating system software. Software applications may also be stored in RAM.

The development manager 510 may also include a primary storage means 516 such as a magnetic hard disk drive and secondary storage means 517 such as a magnetic disc drive and an optical disc drive. The drives and their associated computer-readable media provide non-volatile storage of computer-executable instructions, data structures, program modules and other data for the manager 510. Software applications may be stored on the primary and secondary storage means as well as the system memory.

The development manager 510 may operate in a networked environment using logical connections to one or more remote computers via a network adapter 513. Input/output devices can be coupled to the system either directly or through intervening I/O controllers. A user may enter commands and information into the manager 510 through input devices such as a keyboard, pointing device, or other input devices (for example, microphone, joy stick, game pad, satellite dish, scanner, or the like). Output devices may include speakers, printers, etc. A display device (not shown) is also connected to system bus via an interface, such as a video adapter.

Figure 6:
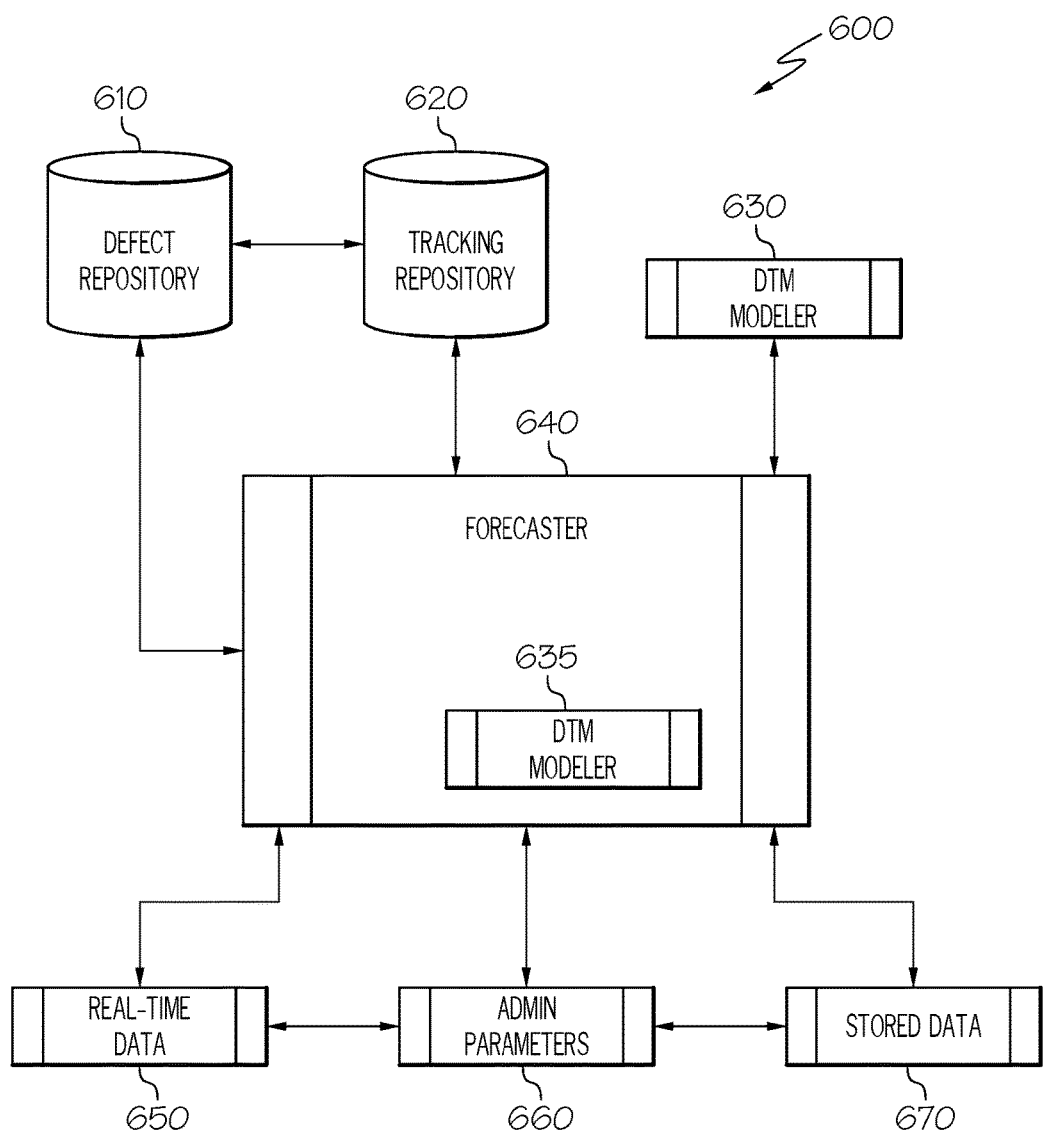
FIG. 6 shows a modeling system including a DTM modeler as may be employed in embodiments.

FIG. 6 shows a forecasting system 600 as may be employed in embodiments. Visible in FIG. 6 are defect repository 610, tracking registry 620, external DTM modeler 630, internal DTM modeler 635, forecaster 640, real-time data inputs 650, administration parameter inputs 660, and stored data inputs 670. In use the forecaster 640 may networked to communicate with and receive inputs from any of the defect repository 610, tracking registry 620, external DTM modeler 630, internal DTM modeler 635, real-time data inputs 650, administration parameter inputs 660, and stored data inputs 670. The forecaster may consider and use these inputs and associated information to model project status in real-time and for previous periods of time. The forecaster 640 may be rendered as both hardware and software and a combination of the two. As a server, it may have an internal DTM modeler as well as access to an external DTM modeler. Each modeler may be used to determine a variable defect rate density for a certain period of time as well as the most recently calculated and applicable variable defect rate density. The forecaster may use the internal DTM modeler for higher bandwidth modeling and the external DTM modeler for lower bandwidth modeling and vice-versa. The inputs 650, 660, and 670 may generate their own queries for gathering information for the forecasting to be conducted by the forecaster 640.

As described throughout, forecasting system 600 may employ storage to allow for comparisons to previous forecasts and projects. As discussed above, this information may include available programmers, historic deliverables, historic measurables, and project timetables. This may also include previously monitored defects and how these defects influenced a project for one and many iterations. This may also include a tracking registry 620 for retention of ongoing projects. While shown as discrete devices in FIG. 6, the modelers, registries, and forecasters of FIG. 6 may comprise a single device and fewer than those shown in FIG. 6 in embodiments.

As noted above, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions in embodiments may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While it is understood that the process software for model project forecasting may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

The process software which consists of the model project forecasting may be integrated into a client, server and network environment by providing for the process software to coexist with applications, operating systems and network operating systems software and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level. After ensuring that the software, where the process software is to be deployed, is at the correct version level that has been tested to work with the process software, the integration is completed by installing the process software on the clients and servers.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A project modeling computer comprising:
a nonvolatile computer readable data storage device; and
a microprocessor,
   wherein the storage device stores instructions for the microprocessor, which when run by the microprocessor, cause the microprocessor to carry out processes comprising:
   consider a model software programming project forecast, where the forecast uses a defect arrival rate,
   compare a forecast of software programming project using real-time defect parameters with the model software programming project forecast, and
   identify a difference between the model software programming project forecast and the forecast of software programming project using real-time defect parameters, and determine if this identified difference satisfies a previously identified threshold.

2. The project modeling computer of claim 1 wherein the storage device stores further instructions for the microprocessor, which when run by the microprocessor, cause the microprocessor to carry out further processes comprising:
   if the identified difference does not satisfy a previously identified threshold, propose remediation for the software programming project.

3. The project modeling computer of claim 2 wherein the storage device stores further instructions for the microprocessor, which when run by the microprocessor, cause the microprocessor to carry out further processes comprising:
    if remediation for the software programming is proposed, then perform a forecast analysis with revised selected parameters.

4. The project modeling computer of claim 3 wherein the storage device stores further instructions for the microprocessor, which when run by the microprocessor, cause the microprocessor to carry out further processes comprising:
    receive additional parameters for the forecast software programming project and propose a new forecast of software programming project.

5. The project modeling computer of claim 1 wherein comparing a forecast of software programming project using real-time defect parameters with the model software programming project forecast comprises superimposing the forecast of software programming project using real-time defect parameters over the model software programming project forecast.

6. The project modeling computer of claim 1 wherein the storage device stores further instructions for the microprocessor, which when run by the microprocessor, cause the microprocessor to carry out further processes comprising:
    adapting the consider a model software programming project forecast using a variable defect arrival rate or density or both.

7. A method of project modeling using a computing system comprising:
    at a microprocessor of the computing system, considering a model software programming project forecast, where the forecast uses a defect arrival rate,
    at a microprocessor of the computing system, comparing a forecast of software programming project using real-time defect parameters with the model software programming project forecast, and
    at a microprocessor of the computing system, identifying a difference between the model software programming project forecast and the forecast of software programming project using real-time defect parameters, and determine if this identified difference satisfies a previously identified threshold.

8. The method of project modeling using a computing system of claim 7 further comprising:
    if the identified difference does not satisfy a previously identified threshold, proposing remediation for the software programming project.

9. The method of project modeling using a computing system of claim 8 comprising:
    if remediation for the software programming is proposed, then performing a forecast analysis with revised selected parameters.

10. The method of project modeling using a computing system of claim 9 further comprising:
    receiving additional parameters for the forecast software programming project and propose a new forecast of software programming project.

11. The method of project modeling using a computing system of claim 7 wherein comparing a forecast of software programming project using real-time defect parameters with the model software programming project forecast comprises superimposing the forecast of software programming project using real-time defect parameters over the model software programming project forecast.

12. The method of project modeling using a computing system of claim 7 further comprising:
    adapting the consider a model software programming project forecast using a variable defect arrival rate or density or both.

13. A nonvolatile computer storage device comprising instructions for a microprocessor, which when run by the microprocessor, cause the microprocessor to carry out processes comprising:
    consider a model software programming project forecast, where the forecast uses a defect arrival rate,
    compare a forecast of software programming project using real-time defect parameters with the model software programming project forecast, and
    identify a difference between the model software programming project forecast and the forecast of software programming project using real-time defect parameters, and determine if this identified difference satisfies a previously identified threshold.

14. The nonvolatile computer storage device of claim 13 wherein the storage device stores further instructions for the microprocessor, which when run by the microprocessor, cause the microprocessor to carry out further processes comprising:
    if the identified difference does not satisfy a previously identified threshold, propose remediation for the software programming project.

15. The nonvolatile computer storage device of claim 14 wherein the storage device stores further instructions for the microprocessor, which when run by the microprocessor, cause the microprocessor to carry out further processes comprising:
    if remediation for the software programming is proposed, then perform a forecast analysis with revised selected parameters.

16. The nonvolatile computer storage device of claim 15 wherein the storage device stores further instructions for the microprocessor, which when run by the microprocessor, cause the microprocessor to carry out further processes comprising:
    receive additional parameters for the forecast software programming project and propose a new forecast of software programming project.

17. The nonvolatile computer storage device of claim 13 wherein comparing a forecast of software programming project using real-time defect parameters with the model software programming project forecast comprises superimposing the forecast of software programming project using real-time defect parameters over the model software programming project forecast.

18. The nonvolatile computer storage device of claim 13 wherein the storage device stores further instructions for the microprocessor, which when run by the microprocessor, cause the microprocessor to carry out further processes comprising:
    adapting the consider a model software programming project forecast using a variable defect arrival rate or density or both.

\* \* \* \* \*